March 8, 1966 H. E. SCHULIEN ETAL 3,238,790
DUAL AIR BEARING AND MECHANICAL BEARING ASSEMBLY
FOR HIGH PERFORMANCE GYROSCOPE
Filed Nov. 13, 1961 3 Sheets-Sheet 1

INVENTORS
HOWARD E. SCHULIEN
WILLIAM H. FICKEN
BY Herbert L. Davis
ATTORNEY

United States Patent Office 3,238,790
Patented Mar. 8, 1966

1

3,238,790
DUAL AIR BEARING AND MECHANICAL BEARING ASSEMBLY FOR HIGH PERFORMANCE GYROSCOPE
Howard E. Schulien, Montville, and William H. Ficken, Hoboken, N.J., assignors to The Bendix Corporation, Teterboro, N.J., a corporation of Delaware
Filed Nov. 13, 1961, Ser. No. 151,718
7 Claims. (Cl. 74—5)

This invention relates to an improved bearing assembly for a gyroscope comprised of a normally operative low friction fluid bearing and a thrust and radical bearing co-operating therewith and which thrust and radical bearing comes into operation when the low friction fluid bearing becomes inoperative.

This invention contemplates the provision of a high performance combination mechanical bearing and air or fluid bearing for mounting a gyroscopic instrument with freedom about an axis and a bearing mechanism which is compact, easily assembled, and of rugged construction which will operate under high "G" conditions such as exist when an aircraft or satellite is being boosted into space and which will operate equally as well in a low "G" field such as exists after the initial booster phase has been completed. More specifically, this invention contemplates the provision of bearing assembly comprising a cup shaped fluid bearing having unique means for uniformly distributing fluid between the fluid bearing faces of the fluid bearing which is coaxially mounted with respect to a mechanical bearing wherein the bearing assembly is operatively interposed between the gyroscope casing and the gyro element in axial alignment with the axis of the gyroscope.

An object of the invention is to provide improvements in a dual bearing assembly for a gyroscope of a type such as disclosed generally by U.S. Patent No. 2,915,902 granted December 8, 1959, to Richard G. Brugger.

The patent to Brugger 2,915,902, although not concerned with the problems encountered in supporting a gyro element with freedom about an axis under both high and low "G" acceleration conditions, discloses a combination air bearing and mechanical bearing. The gyroscope bearing assembly of Brugger has a single source of supply to the air bearing face portions of a hemispherical button and a hemispherical depression. Brugger found it necessary to block off the passage from the air bearing supply to the mechanical bearings by a plate in one embodiment of the invention and to block off the mechanical bearings from the air bearing supply by mounting the mechanical bearings in a particular manner on a post part of the air bearing in an alternative embodiment of the invention. Further, the bearing assembly of Brugger is bolted in place and is somewhat difficult to assemble and dis-assemble and has no visible accurate means of adjustment. In contrast, in the improved gyroscope bearing assembly of the instant invention, fluid is supplied uniformly to bearing face surfaces of the air bearing through a plurality of openings in one of the air bearing parts. No special structure is required for preventing the air bearing supply fluid from communicating with the mechanical bearing, and the bearing assembly is provided with threadable connecting means and is therefore easily assembled, dis-assembled and adjusted. Other advantages of the bearing assembly of this invention over the bearing of Brugger and other prior art bearings will become apparent from the following disclosure.

It is an object of this invention to provide an improved combination fluid bearing assembly including a pair of cooperating cup shaped bearing parts and a radial end thrust bearing for supporting gyroscopic means relative to a mounting means wherein a mounting post projects

2 from one of the above mentioned means, the mechanical thrust bearing is rotatably mounted on the mounting post, the first cup shaped fluid bearing part is rotatably mounted on the thrust bearing and the second cup shaped fluid bearing part is mounted on the other of the above mentioned means in cooperating relationship with the first cup shaped air bearing part, and one of the cup shaped air bearing parts is provided with spaced openings therethrough for uniformly supplying fluid between the air bearing parts.

It is another object of the invention to provide a combination cup shaped fluid bearing and mechanical thrust bearing for supporting a gyro element relative to a mounting element with freedom of movement about an axis wherein the mechanical thrust bearing is operative when the fluid bearing is bottomed out under high "G" acceleration conditions and the fluid bearing is normally operative under low "G" acceleration conditions.

It is another object of the invention to provide a simple light weight compact bearing assembly for supporting a gyro element relative to a mounting means including a mounting post, a first cup shaped air bearing part having an outer air bearing face with spaced openings therethrough for supplying air to the air bearing coaxially mounted on the mechanical bearing and a second cup shaped air bearing part having an inner air bearing face mounted on the gyro element in cooperating relation with the first air bearing part.

It is a further object of this invention to provide a gyroscope comprised of a casing, a mounting post having a central through hole threadably adjustably secured to the casing in alignment with an axis of the gyroscope, a mechanical bearing supportingly secured on the mounting post, a first cup shaped air bearing part having spaced openings therethrough and an air bearing face which is rotatably secured to the mechanical bearings and a second cup shaped air bearing part having an air bearing face which is secured to the gyro element of the gyroscope in cooperating relation with the first air bearing part wherein the mounting post is adjustable to displace the air bearing face of the first air bearing part a predetermined distance from the air bearing face of the second air bearing part.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for purposes of illustration and description only, and are not to be construed as defining the limits of the invention.

Figure 1:
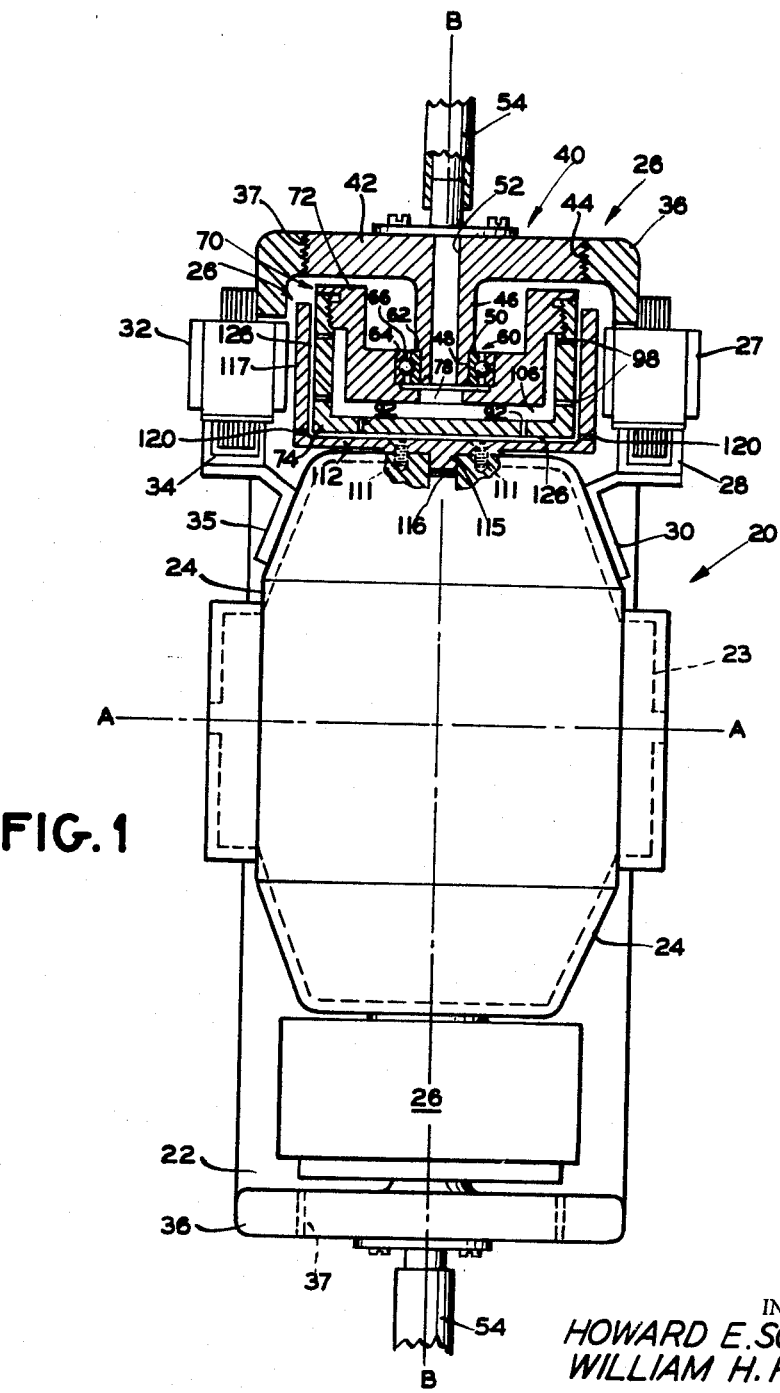
FIGURE 1 is a view partially in section of a gyroscope embodying the bearing assembly of this invention.

Referring now to the drawings, and more particularly to FIGURE 1, wherein there is shown a gyroscope 20 embodying the bearing assembly of this invention. Gyroscope 20 is comprised of a casing 22, and a gyro rotor element 23 mounted for rotation on an axis A—A relative to a gimbal 24 pivotally supported by the casing 22 on identical bearing assemblies 26 about an axis B—B extending perpendicular to the axis of the gyro rotor element 23. The gyro rotor element 23 is driven by suitable motor means not shown. A ferro-magnetic torquer 27 is carried by the casing 22 and cooperates with an annular armature 28 of conventional type carried by outwardly projecting ears 30 affixed to the gimbal 24. A ferro-magnetic electrical pickoff 32 of conventional type is carried by the casing 22 and cooperating therewith is an annular armature 34 carried by outwardly projecting ears 35 affixed to the gimbal 24.

Casing 22 serves as a mounting means for the gimbal 24 carrying the gyro rotor 23 and is provided with projecting members 36 having axially opposite threaded through holes 37, the centerline of which are in axial alignment with the axis B—B of the gyro gimbal 24 and the members 36 are arranged to support the bearing assemblies 26.

Each improved bearing assembly 26 of this invention comprises a trunnion or mounting post 40 having an enlarged cylindrical head end 42 peripherally threaded at 44; an elongated central post portion 46 projecting inwardly from the head 42 having a reduced end portion 48 forming with the post portion 46 an annular seat 50; and a central hole 52 through which air under pressure is supplied to the air bearing 26 from an air pressure conduit 54, as will more clearly appear. Mounting post 40 is secured to casing 22 by threading the mounting post head 42 into the mating threads 37 of the member 36 projecting from the casing 22. By manipulation of the mounting post 42 the annular seat 50 may be adjusted to extend a desired distance into the bearing assembly 26 as hereinafter explained. When the mounting post 40 is in its emplaced position the post portion 46 thereof is in axial alignment with the axis B—B of the gimbal 24 of the gyroscope 20.

Figure 2:
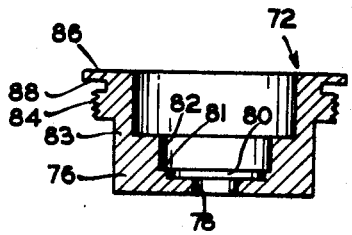
FIGURE 2 is a sectional side view of the mounting portion of the first air bearing part.

A conventional auxiliary mechanical radial and thrust bearing 60 having an inner race 62, an outer race 64 and a plurality of roller bearings 66 disposed therebetween is snugly fit onto the reduced end portion 48 of post 46 with an annular surface of the inner bearing race 62 seated against the mounting post seat 50. The particular type of mechanical bearing used is not critical to the invention and the ball bearing disclosed above is for illustrative purposes only as journal bearings, a torsion wire suspension, a crossed spring suspension or other bearing means well known in the gyro field may be used. Coaxially mounted on the outer race 64 of bearing 60 is a first fluid or air bearing part 70. Air bearing part 70 is comprised of a mounting portion 72 and an air or fluid bearing portion 74. Mounting portion 72 best seen in FIGURE 2, comprises a circular bottom plate or base 76 having a central through opening 78. Opening 78 is double counterbored to form annular recess 80, annular seat 81, and annular recess 82. A cylindrical sidewall 83 extends upwardly from bottom plate 76. Cylindrical sidewall 83 at its upper and outer annular edge is provided with outwardly extending connecting means in the form of threads 84. The upper terminal end 86 of cylindrical sidewall 83 projects radially outwardly over threads 84 to form downwardly facing annular bearing seat 88. Mounting portion 72 is mounted on the outer bearing race 64 of bearing 60 with the outer annular surface of outer bearing race 64 snugly fitting into annular recess 82 of the mounting portion and the bottom annular surface of outer bearing race 64 seated upon the annular bearing seat 81 of the mounting portion. When the mounting portion 72 is in its mounted position on bearing 60 a free space is provided by annular recess 80 between the lower face of the bearing 60 and the seat formed in base 76 by the counterbore which forms annular recess 80. This free space prevents binding of the bearing and permits free passage of air under pressure from the bore 52 and through the opening 78 of the mounting portion 72 into the air bearing part 70.

Figure 3:
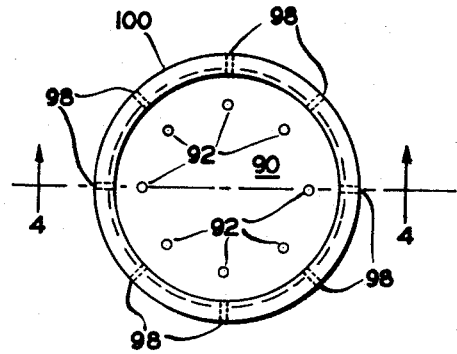
FIGURE 3 is a top plan view of the air bearing portion of the first air bearing part.
Figure 4:
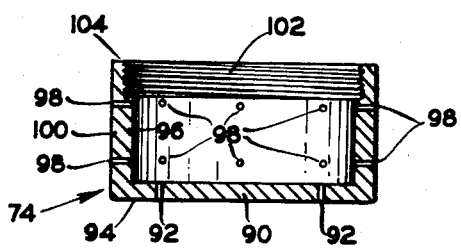
FIGURE 4 is a sectional view of the air bearing portion of FIGURE 3 taken along lines 4—4 of FIGURE 3.

The other portion of the first air bearing part 70 is the air bearing portion 74 best seen in FIGURES 3 and 4. Air bearing portion 74 comprises a bottom circular plate 90 having a plurality of openings 92 which may be equally spaced in a circle about circular bottom plate 90 and which extend therethrough. Bottom plate 90 has a smooth machined air bearing bottom face 94.

Extending upwardly from the peripheral edge of bottom plate 90 is a cylindrical sidewall 96 having two spaced annular rows of preferably eight equally spaced openings 98 therethrough. The outer surface of cylindrical sidewall 96 is machined to form smooth outer air bearing face 100. The upper inner annular open end of cylindrical sidewall 96 is provided with inwardly extending connecting means in the form of screw threads 102. The top terminal end 104 of cylindrical sidewall 96 acts as a seat as will more clearly appear. Cylindrical sidewall 96 is preferably formed integrally with bottom plate 90. However, cylindrical sidewall 96 may be secured to bottom 90 by screws which extend through the bottom plate and thread into threaded blind bores in the end of cylindrical sidewall. It will be seen fom the foregoing that the bottom plate 90 forms with cylindrical sidewall 96 a cup shaped air bearing portion 74 having a smooth outer air bearing face. The air bearing portion is connected to the mounting portion 72 by threadably engaging the screw threads 102 of air bearing portion 74 with the mating screw threads 84 of mounting portion 72 to form first air bearing part 70. When the air bearing portion 74 is secured to the mounting portion 72 the seat formed by the top terminal end 104 of cylindrical sidewall 96 of air bearing portion 74 abuts the seat 88 of mounting portion 72 to space the bottom plate portions 90 and 76 and cylindrical sidewalls 96 and 83 of air bearing portion 74 and mounting portion 72 a predetermined distance apart to form cylindrical cup shaped diffusion chamber 106.

Figure 5:
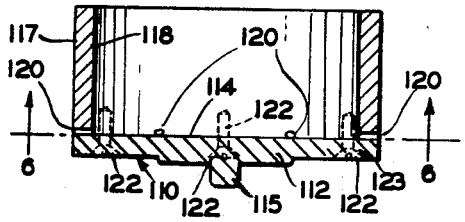
FIGURE 5 is a sectional side view of a second air bearing part.
Figure 6:
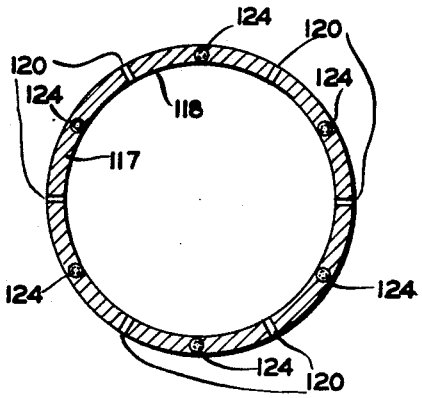
FIGURE 6 is a sectional view of the second air bearing part of FIGURE 5 taken along line 6—6 of FIGURE 5.

A second fluid or air bearing part 110 is fixedly secured to the gyro gimbal 24 by screws 111. Air bearing part 110, best seen in FIGURES 5 and 6 comprises a circular bottom plate 112 having a smooth machined planar inner air bearing face 114, and a central aligning pin 115 which projects downwardly from the bottom face of the plate and fits into an aligning hole 116 provided in the gyro gimbal 24. A cylindrical sidewall 117 extends upwardly from the bottom plate 112. Cylindrical sidewall 117 is provided with a smooth machined inner air bearing face 118 and a plurality of preferably six spaced apart orifice openings 120 therethrough at the juncture of the sidewall 117 and bottom plate 112. Bottom plate 112 and cylindrical sidewall 117 may be formed structurally integrally together in which case openings 120 would be drilled and tapped. Bottom plate 112, however, is shown connected to sidewall 117 by a plurality of screws 122, the shanks of which extend through counterbores 123 in bottom plate 112 and thread into threaded blind bores 124 formed in the bottom terminal end of sidewall 117. In this construction, the openings 120 are formed by notching the terminal end of cylindrical sidewall 117. This latter mentioned method of construction is preferred because of the ease of manufacture and small amount of waste which results from this method of manufacture. The bearing part 110 is easily installed by slipping it through the threaded through hole 37 in one of the projecting members 36 such that aligning pin 115 fits into aligning hole 116. Then screws 111 are placed into counterbored through holes in bottom plate 112 and the shanks thereof are screwed into blind bores in the gyro element 24 such that the heads at the screws are flush with the top suface 114 of bottom plate 112.

It will be apparent from the foregoing that the bottom plate 112 and cylindrical sidewall 117 together form a second air bearing part 110 which is of cylindrical cup shaped configuration having an inner air bearing face. The second cylindrical cup shaped air bearing part 110 in its mounted position is in axial alignment with the axis B—B of the gyro gimbal 24. Further, the inner air bearing faces 114 and 118 of bottom plate 112 and cylindrical sidewall 117 of the second air bearing part 110 are displaced a predetermined small distance from the corresponding outer air bearing faces 94 and 100 of the first air bearing part 70 to form a cylindrical cup shaped air bearing space 126. The displacement of air bearing parts a predetermined distance apart is accomplished by theadably adjustably manipulating the mounting part 40 relative to the threaded casing through hole 37.

The first air bearing part 70 is mounted on auxiliary bearing 60 such that a radial line projected from the center of bearing 60 intersects the median point of the portion of the air bearing space 126 defined by the air bearing faces 100 and 118 of air bearing parts 70 and 110, respectively. This disposition of bearing 60 at substantially the center of the air bearing provides a balanced design which permits the use of the single bearing 60 as will more clearly appear.

It will be appreciated from the foregoing that the bearing assembly 26 is of compact light weight, rugged construction; that the impoved bearing assembly of this invention is easily assembled and dis-assembled by screw thread connecting means; and that the bearing assembly is easily adjusted to a desired setting by manipulating the screw thread interconnecting means.

Operation

After the bearing assemblies are installed and adjusted, the central through hole 52 of each mounting post 40 is then connected to a source of fluid pressure supply, preferably air under pressure, applied through the conduits 54.

While the gyorscope is being used, air is continuously supplied though the through hole 52 into the diffuser chamber 106 of the first air bearing part 70. The air supplied to diffusion chamber 106 may leak through the mechanical bearing 60 as no structure is interposed between the bore 52 and the mechanical bearing. The air is therefore supplied to the diffusion chamber under sufficient pressure to permit leakage to occur without detrimentally affecting the operation of the air bearing. Air passes from diffuser chamber 106 through spaced openings 92 and 98 in the bottom plate 90 and the cylindrical sidewall 96 of the air bearing portion 74 of air bearing part 70 into the space 126 between the air bearing faces of air bearing parts 70 and 110. The air supplied to space 126 through the top annular row of openings 98 in the cylindrical sidewall of air bearing portion 74 is permitted to escape from space 126 through the annular opening at the top terminal end of the air bearing parts. The air supplied to space 126 through the openings 92 in the bottom plate 90 and the bottom annular row of openings 98 in the cylindrical sidewall 96 of air bearing portion 74 is permitted to escape from space 126 through the openings 120 disposed at the juncture of bottom plate 112 and cylindrical sidewall 117 of air bearing part 110.

It will be seen therefore that a substantially balanced exhaust of air acting between the cylindrical sidewalls of the air bearing parts is effected. Consequently, turning moments caused by the effect of the air bearing which act to overturn the air bearing part 70 relative to auxiliary bearing 60 cancel out about the median axis half way between the ends of the portion of space 126 defined by the cylindrical sidewalls of the air bearing parts 70 and 110. The air bearing part 70 is mounted on the auxiliary bearing at the center of this axis; therefore, these overturning moments do not act to overturn the air bearing 70 relative to auxiliary bearing 60. Hence, a balanced design is achieved.

It will be appreciated from the foregoing that air is uniformly supplied to the air bearing space 126 through the spaced openings in the first air bearing part communicating therewith at all times while the gyroscope is in operation. It will further be appreciated that the air in air bearing space 126 is operative to continuously force the first air bearing part 70 away from the second air bearing part 110 and to maintain the first air bearing part centered with respect to the second air bearing part. The first air bearing part 70 is constrained against axial and radial displacement by the auxiliary bearing 60. It will be seen therefore that bearing 60 is normally loaded by the operation of the air bearing. Therefore, radial and axial play in the auxiliary bearing is effectively eliminated. In this regard, it is important to note that different bearings have different degrees of freedom between their relatively movable parts. The bearing assembly of this invention is not adversely affected by such auxiliary bearings which have different degrees of freedom between their relatively movable parts because the mounting post 40 may be adjusted relative to casing 22 to vary the displacement of the air bearing parts from each other to compensate for play in the particular auxiliary bearing being used.

The air bearing assembly 26 of this invention is particularly designed for use in an aircraft or space vehicle wherein the gyro element 24 is, under normal operation conditions, supported at each end by identical bearing assemblies 26 with freedom about the gyro gimbal axis B—B on the thin film of air in the space 126 between the air bearing faces of the air bearing parts 70 and 110 of each bearing assembly.

When a "G" acceleration is applied to the gyroscope which is higher than the air bearing can withstand, as when a space vehicle carrying the gyroscope is boosted into space, the first air bearing part 70 of one bearing assembly 26 bottoms out against the second air bearing part 110 thereof and the second air bearing part of the other bearing assembly bottoms out against the first air bearing part thereof. Metal to metal contact is therefore achieved beween the first and second air bearing parts of each bearing assembly and relative rotation between the air bearing parts ceases. At this time, the auxiliary bearings 60 of each bearing assembly come into play so that the gimbal 24 may pivot about axis B—B on the auxiliary bearings 60. As soon as the high "G" acceleration is relieved, as when a space vehicle goes into orbit, the air bearing comes back into play and again provides a substantially friction free support for gyro gimbal 24.

Although the bearing assembly of this invention was particularly designed to support a gyro gimbal in a casing with freedom of movement about the axis B—B, it will be appreciated by one skilled in the art that the bearing assembly of this invention is susceptible of use in other and different environments. Further, the mounting post 40, auxiliary bearing 60 and first air bearing part 70 have been disclosed as being supported by the supporting members 36 carried by casing 22 and the second air bearing part as being supported by the gyro gimbal 24. It is to be understood that it is within the scope of this invention to support mounting post 40, auxiliary bearing and first air bearing part 70 by gyro gimbal 24 and to support the second air bearing part 110 by casing 22.

Figure 7:
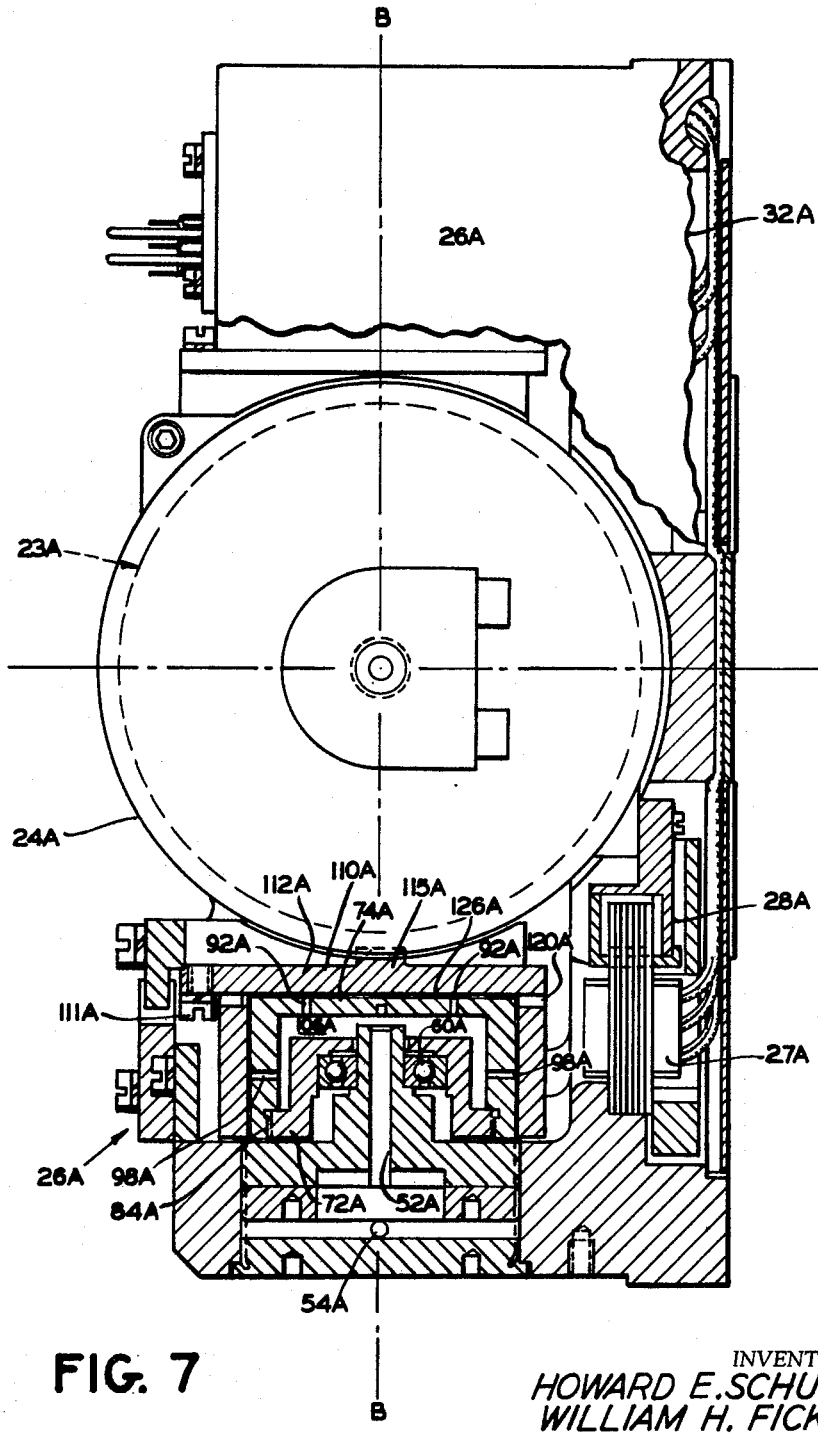
FIGURE 7 is a view partially in section of a gyroscope embodying a modified form of the bearing assembly of the invention.

A modified form of the invention is illustrated in FIGURE 7 in which corresponding parts heretofore described with reference to FIGURE 1 have been indicated by like numerals to which the letter A has been affixed. The operation of the modified structure of FIGURE 7 will be readily apparent from the foregoing description of FIGURE 1 and therefore no further explanation is deemed necessary.

Although two embodiments of the invention have been illustrated and described in detail, it is to be expressly understood that the invention is not limited thereto. Various changes can be made in the design and arrangement of the parts without departing from the spirit and the scope of the invention as the same will now be understood by those skilled in the art.

What is claimed is:

1. A bearing assembly comprising in combination: a fluid bearing including a pair of cooperating cylindrical cup shaped fluid bearing parts and a radial and thrust bearing for supporting a gyro element means with pivotal freedom relative to a mounting means wherein a mounting post projects from one of said means, said radial and thrust bearing being pivotally mounted on said mounting post, one of said fluid bearing parts being rotatably mounted on said radial and thrust bearing and the other of said fluid bearing parts being mounted on the other of said means in cooperating relationship with said first fluid bearing part, and one of said fluid bearing parts being provided with a plurality of substantially uniformly spaced openings therethrough to permit fluid to be uniformly supplied between said cooperating cylindrical cup shaped fluid bearing parts.

2. The bearing assembly of claim 1, wherein the other of said cylindrical cup shaped fluid bearing parts has a plurality of substantially uniformly spaced openings through the lower portion to permit fluid supplied between the cooperating cylindrical cup shape fluid bearing parts to escape therethrough.

3. The bearing assembly of claim 1 wherein each of said cooperating cylindrical cup shaped fluid bearing parts comprises a circular bottom plate and a cylindrical sidewall extending upwardly therefrom, the spaced openings in said one fluid bearing part being spaced in a circle on the bottom plate thereof and extending therethrough and being spaced about the cylindrical sidewall thereof and extending therethrough, and the spaced openings in the other of said cylindrical cup shaped fluid bearing parts being spaced about the fluid bearing part at the juncture of the bottom plate and the cylindrical sidewall thereof.

4. The bearing assembly of claim 1 wherein the fluid bearing part pivotally mounted on said radial and thrust bearing comprises a mounting portion mounted on said radial and thrust bearing having outwardly extending connecting means and a cylindrical cup shaped fluid bearing portion having inwardly extending connecting means cooperating with the outwardly extending connecting means on said mounting portion to removably connect said mounting portion and said fluid bearing portion.

5. In an air bearing; a cylindrical cup shaped air bearing part adapted to be rotatably mounted on a mounting post having a central through hole for supplying air under pressure to the air bearing comprising: a first cylindrical cup shaped mounting portion including a circular bottom plate having a central through opening and a cylindrical sidewall extending upwardly from the circular bottom plate having connecting means extending outwardly therefrom; a second cylindrical cup shaped portion including a circular bottom plate having an outer air bearing face and a cylindrical sidewall extending upwardly from the peripheral edge of said circular bottom plate having an outer air bearing face and connecting means extending inwardly therefrom cooperating with the outwardly extending connecting means of said first cup portion to removably secure said first and second cup portion together forming a diffusion chamber therebetween, said circular bottom plate and the said cylindrical sidewall of said second air bearing portion having a plurality of substantially equally spaced orifice openings therethrough whereby air is uniformly supplied through said orifice openings over said air bearing face.

6. A bearing assembly for a gyroscope having a gyro element, and means mounting said gyro element with freedom about an axis comprising a mounting post having a central through hole therein removably secured to said mounting means in alignment with said axis, thrust bearing means having an inner race and an outer race rotatably mounted on said mounting post, a first cup shaped air bearing part having orifice openings therein rotatably mounted on the outer race of said thrust bearing means, a second cup shaped air bearing part carried by said gyro element cooperating with said first air bearing part, and said central through hole in said mounting post and said orifice openings in said first air bearing part for supplying air to said air bearing.

7. A gyroscope comprising: a gyro element having a pivotal axis, a casing, a mounting post having a central through hole therein and a reduced end portion threadably removably secured to said casing in axial alignment with said pivotal axis; a thrust bearing having an inner race and an outer race removably mounted on the reduced end portion of said mounting post; a first cylindrical cup shaped air bearing part having spaced openings therein, said first air bearing part including a mounting portion mounted on the outer race of said thrust bearing and including a circular bottom plate having an outer air bearing face and a cylindrical sidewall extending upwardly from said circular bottom plate having an outer air bearing face, a second air bearing part having inner air bearing faces the outer air bearing faces of said first air bearing part cooperating with the inner air bearing faces of said second air bearing part to support said gyro element on a thin layer of air with respect to said casing upon the application of air under pressure through the central through hole in said mounting post and the spaced openings in said first air bearing part.

References Cited by the Examiner

UNITED STATES PATENTS

| | | | |
|---|---|---|---|
| 2,623,353 | 12/1952 | Gerard | 308—35 |
| 2,670,146 | 2/1954 | Heizer | 308—9 X |
| 2,915,902 | 12/1959 | Brugger | 74—5 X |
| 2,925,736 | 2/1960 | Mueller | 74—5 X |
| 2,969,680 | 1/1961 | Linn et al. | 74—5 |

BROUGHTON G. DURHAM, *Primary Examiner.*